United States Patent Office 3,280,195
Patented Oct. 18, 1966

3,280,195
REDUCTION OF PHOSPHINE OXIDES
Hans Fritzsche, Niederpleis, Ulrich Hasserodt, Menden, and Johan van Olmen and Friederich W. A. G. K. Korte, Hangelar, Germany, assignors to Shell Oil Company, New York, N.Y., a corporation of Delaware
No Drawing. Filed July 26, 1963, Ser. No. 297,952
Claims priority, application Germany, Feb. 22, 1963, S 83,857
10 Claims. (Cl. 260—606.5)

This invention relates to a process for the preparation of phosphines and particularly tertiary phosphines. More specifically, the invention relates to the preparation of tertiary phosphines by reduction of the corresponding phosphine oxides.

Phosphines, and particularly, triphenyl and tricyclohexyl phosphine are employed in the preparation of such materials as vitamin A, for example, the Wittig carbonylolefination [Angew. Chem. 72, 811 (1960)].

A number of methods have been described in the prior art for the reduction of phosphine oxides to phosphines. Reduction of tertiary phosphine oxide to the corresponding tertiary phosphines is possible by the use of lithium aluminum hydride or calcium aluminum hydride. However, this method, although successful with trialkylphosphine oxides, results in a conversion of triaryl phosphine oxides to the corresponding diarylphosphine. It is also possible to convert triphenylphosphine oxide to triphenylphosphine dichloride and then reduce the dichloride with sodium in the presence of toluene, lithium aluminum hydride or Raney nickel to the corresponding phosphine. Still another method which has met with limited success is the conversion of triphenylphosphine oxide to triphenylphosphine sulfide and subsequent reduction with lithium aluminum hydride to the triphenyl phosphine. However, none of the above methods have proved to be entirely satisfactory and commercially feasible.

It is, therefore, a principal object of the present invention to provide an efficient and economical method for reducing phosphine oxides to corresponding phosphines.

These and other objects will be better understood from the description of the invention as given hereinafter.

Now, in accordance with this invention, it has been found that tertiary phosphine oxides can be reduced to the corresponding tertiary phosphines by reaction with certain reducing agents in the presence of a silicon halide and alternatively by reacting a reducing agent with a complex of the phosphine oxide and silicon halide. Middle halide silanes have been found to be especially effective with silicon tetrachloride usually being preferred. However mixed silicon halides, i.e., silicon dichlorodibromide are also within the scope of this invention.

The amount of silicon tetrahalide material necessary according to the invention can be varied over a wide range. Quantities of silicon tetrahalide which vary from ⅛ to 2 moles of silicon tetrahalide per mole of phosphine oxide used are quite acceptable whereas amounts from ¼ to ¾ mole of silicon tetrahalide per mole of phosphine oxide are most preferred.

Various reducing agents are effective in carrying out the process of this invention. Such diverse agents as alanates (metal aluminum hydrides), e.g., LiAlH₄; the alkali, alkaline earth and other metals such as Na, K, Ca, Mg, Al, and Zn are all effective reducing agents in this process. In addition hydrogen in the presence of a hydrogenating catalyst such as palladium on animal charcoal, synthesis gas in the presence of homogenous catalysts such as dicobalt octacarbonyl, rhodium chloride and the like also are effective. Preferred reducing agents are the metals, magnesium and zinc, and in particular, metallic aluminum.

The reaction can be carried out by two alternative methods both of which are equally effective. For example, the tertiary phosphine oxide can be reacted initially with the silicon halide to form what may be assumed to be intermediatery complexes, e.g., the complex

[2(C₆H₅)₃P=O]·1SiCl₄ isolated from triphenyl phosphine oxide and silicon tetrachloride and subsequently this complex can be converted to the triphenyl phosphine with the reducing agent. In a single-step process, the phosphine oxide is simultaneously reacted with the silicon halide and the reducing agent. A single-step process is preferred.

Various tertiary phosphine oxides generally of from 3 to 60 carbon atoms, may be converted into tertiary phosphines by the process of this invention, particularly trihydrocarbon phosphine oxides, including trialkyl, tricycloalkyl, trialkenyl, tricycloalkenyl, triaryl, trialkaryl and triaralkylphosphine oxides and corresponding mixed trihydrocarbon phosphine oxides. The invention is especially useful for reducing tertiary aryl phosphine oxides, including alkaryl phosphine oxides, especially triaryl phosphine oxides such as triphenyl phosphine oxide and tritolyl phosphine oxides, to corresponding phosphines.

In general, the tertiary phosphine oxides may be represented by the formula RR'R''PO, R, R' and R'' being independently selected organic, preferably hydrocarbon, of from 1 to 18 carbon atoms. R and R' taken together may also form a ring, as for instance, in phospholine oxides of the formula

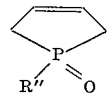

The reduction of the phosphine oxide is effected at elevated temperatures, generally above 100° C. and preferably above 200° C. Temperatures of from 200° C. to 350° C. are advantageously employed, although temperatures above 350° C. are also useful.

A solvent is not necessary for carrying out the reaction, but the use of inert organic solvents such as aromatic hydrocarbons and ethers under certain circumstances are desirable and even produce a greater yield of phosphine and minimize the decomposition of the phosphine oxide to other products. For example, excellent results are obtained with such materials as naphthalene, benzene, toluene, diethylene glycol dimethyl ether, glycol diethyl ether and diphenyl oxide. Although the amount of solvent is not in any way critical, from about 0.5 to 4 parts by weight for every part by weight of phosphine oxide is suitable with equal parts by weight the most preferred.

The reaction is suitably carried out in the liquid phase. Superatmospheric pressures are generally necessary to keep the reactants, e.g., silicon tetrachloride, in the reaction mixture. Hence, it is preferred to carry out the reaction in autoclaves to pressures of 20 to 200 atmospheres gauge or even more. The employment of equipment and linings made of corresion-resisting material such as glass, enamel, or stainless steel is usually preferred. Various modifications of reaction conditions are of course well within the skill of the technician, e.g., the reaction can be performed with phosphine oxide and silicon halide, and if desired, hydrogen, being passed under pressure through a pipe filled with the reducing agent, e.g., granular aluminum. The reaction may be carried out in inert atmospheres such as nitrogen, argon or other inert gases.

The following specific examples of the invention will serve to illustrate more clearly the application of the invention, but they are not to be construed as in any manner limiting the invention thereto.

EXAMPLE I 55.6 grams of triphenyl phosphine oxide (0.2 mole), 34 grams of $SiCl_4$ (0.2 mole) and 10 grams of granular aluminum were introduced into an autoclave. Hydrogen was introduced under 130 atm. pressure at room temperature, and the autoclave was heated to 250° C. for 5 hours with stirring. The contents of the autoclave were passed into 30% NaOH, the precipitate was filtered off and recrystallized from ethanol. The yield was 22 grams of triphenyl phosphine (42% of theory). The product had a melting point of 78° C.

EXAMPLE II 55 grams of triphenyl phosphine oxide (0.2 mole), 68 grams of $SiCl_4$ (0.4 mole) and 5 grams of granular aluminum were treated as in Example I. The yield was 21 grams of triphenyl phosphine (40% of theory).

EXAMPLE III 27.8 grams of triphenyl phosphine oxide, 17 grams of silicon tetrachloride and 2.5 grams of granular aluminum were heated for 4 hours to 150° C. under 100 atm. of hydrogen. The reaction product was passed into 30% NaOH and the insoluble residue was recrystallized from ethanol. The yield was 15.2 grams of triphenyl phosphine (58% of theory).

EXAMPLE IV 27.8 grams of triphenyl phosphine oxide, 17 grams of silicon tetrachloride and 2.5 grams of zinc dust were heated for 4 hours to 250° C. under 100 atm. of $H_2$. The product was worked up as in Example I. The yield was 12.8 grams of triphenyl phosphine (49% of theory).

EXAMPLE V 27.8 grams of triphenyl phosphine oxide, 17 grams of $SiCl_4$ and 3 grams of Al-dust were heated for 8 hours to 150° C. under 100 atm. of $H_2$. The product was worked up as in Example I. The yield was 17.1 grams of triphenyl phosphine (65.3% of theory).

EXAMPLE VI 27.8 grams of triphenyl phosphine oxide were dissolved in 100 ml. of benzene, after which 10 grams of silicon tetrachloride were added dropwise. After some time a complex having the composition $[2(C_6H_5)_3P=O] \cdot 1SiCl_4$ precipitated. This complex was recrystallized from hot benzene.

*Analysis.*—Calculated for $C_{36}H_{30}Cl_4O_2P_2Si$: C, 59.55%; H, 4.1%; Cl, 19.54%. Found: C, 60.8%; H, 3.9%; Cl 18.7%.

18.5 grams of this complex was heated for 4 hours with 0.8 gram of Al-powder to 200° C. under 50 atm. of $N_2$. The reaction product was recrystallized from ethanol and yielded 4.8 grams of triphenyl phosphine. Residue consisted of 6.1 grams of triphenyl phosphine oxide, which is 43% of theory.

EXAMPLE VII 27.8 grams of triphenyl phosphine oxide, 17 grams of silicon tetrachloride and 1 gram of palladium-animal charcoal were heated for 5 hours to 200° C. under 150 atm. of hydrogen. The reaction product was passed into 30% of NaOH, the precipitate filtered off, washed with water and recrystallized from ethanol. Triphenyl phosphine yield was 2.7 grams which was calculated to be 10% of theory.

EXAMPLE VIII 7 grams of triphenyl phosphine oxide and 2.2 grams of silicon tetrachloride were mixed with 0.2 gram of benzene solution of $Co_2(CO)_8$. The reaction mixture was heated for 5 hours to 200° C. under 100 atm. of $CO/H_2$ (1:1) and subsequently passed into 30% of NaOH. The precipitated crystals were recrystallized from ethanol. The yield was 2 grams of triphenyl phosphine which is 30% of theory.

EXAMPLE IX 7 grams of triphenylphosphine oxide, 2.2 grams of silicon tetrachloride and 0.1 gram of rhodium chloride were heated for 5 hours to 200° C. under 300 atm. of $CO/H_2$ (1:1). The reaction product was passed into 30% of NaOH. After recrystallization 2.1 grams of triphenylphosphine was isolated (32% of theory).

We claim as our invention:

1. A process for the conversion of tertiary phosphine oxides to the corresponding phosphines by reacting the tertiary phosphine oxides with a silicon halide and a reducing agent.
2. A process in accordance with claim 1 wherein the silicon halide is silicon tetrachloride.
3. A process in accordance with claim 1 wherein the reducing agent is granular aluminum.
4. A process in accordance with claim 1 wherein the reducing agent is zinc dust.
5. A process in accordance with claim 1 wherein the reducing agent is aluminum dust.
6. A process in accordance with claim 1 wherein the reducing agent is hydrogen and the reaction is carried out in the presence of palladium-animal charcoal.
7. A process in accordance with claim 1 wherein the reducing agent is synthesis gas and the reaction is carried out in the presence of cobalt octacarbonyl.
8. A process in accordance with claim 1 wherein the reaction is effected at a temperature of from 100° C. to 250° C.
9. A process in accordance with claim 1 wherein the reaction product is precipitated with NaOH and recrystalized from ethanol.
10. A process in accordance with claim 1 wherein the reaction is carried out under 100 atmospheres of hydrogen pressure.

No references cited.

TOBIAS E. LEVOW, *Primary Examiner.*

W. F. W. BELLAMY, *Assistant Examiner.*